(12) United States Patent
Bergquist et al.

(10) Patent No.: US 8,448,037 B2
(45) Date of Patent: May 21, 2013

(54) PRESCHEDULED RETRANSMISSION FOR INITIAL ESTABLISHMENT

(75) Inventors: Gunnar Bergquist, Kista (SE); Magnus Linström, Spånga (SE); Tobias Tynderfeldt, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 421 days.

(21) Appl. No.: 12/809,499

(22) PCT Filed: Dec. 20, 2007

(86) PCT No.: PCT/SE2007/051063
§ 371 (c)(1),
(2), (4) Date: Jun. 18, 2010

(87) PCT Pub. No.: WO2009/082303
PCT Pub. Date: Jul. 2, 2009

(65) Prior Publication Data
US 2010/0275086 A1 Oct. 28, 2010

(51) Int. Cl.
*H04L 1/18* (2006.01)
(52) U.S. Cl.
USPC .......................................................... 714/748
(58) Field of Classification Search .................... 714/748
See application file for complete search history.

(56) References Cited

U.S. PATENT DOCUMENTS

| | | | |
|---|---|---|---|
| 7,007,218 B2 * | 2/2006 | Chamberlain | 714/748 |
| 7,181,170 B2 * | 2/2007 | Love et al. | 455/67.13 |
| 8,098,745 B2 * | 1/2012 | Bertrand et al. | 375/260 |
| 8,176,376 B2 * | 5/2012 | Cheng et al. | 714/748 |
| 2004/0042492 A1 | 3/2004 | Suzuki et al. | |

FOREIGN PATENT DOCUMENTS

| | | |
|---|---|---|
| EP | 1211840 A1 | 6/2002 |
| EP | 1545040 A1 | 6/2005 |

OTHER PUBLICATIONS

International Search Report issued in corresponding International application No. PCT/SE2007/051063, mailing date Nov. 27, 2008.
Written Opinion of the International Searching Authority issued in corresponding International application No. PCT/SE2007/051063, mailing date Nov. 27, 2008.
International Preliminary Report on Patentability issued in corresponding International application No. PCT/SE2007/051063 on Jun. 22, 2010.

* cited by examiner

*Primary Examiner* — James C Kerveros
(74) *Attorney, Agent, or Firm* — Potomac Patent Group PLLC

(57) ABSTRACT

A method for a wireless communications network for data packet including a user equipment (UE) and a transceiver node (eNodeB). The user equipment (UE) and the node (eNodeB) intercommunicate over an air interface communication link. The user equipment (UE) transmits a first message (MSG3) in a first scheduled transmission in a random access procedure during setup of the communication link. The first message is transmitted in a first sub frame (TTI=3) and in a second sub frame (TTI=4; TTI=5) within a first roundtrip time (RTT) in a first HARQ- process triggered by the transmission of the first message in the first sub frame (TTI=3).

23 Claims, 6 Drawing Sheets

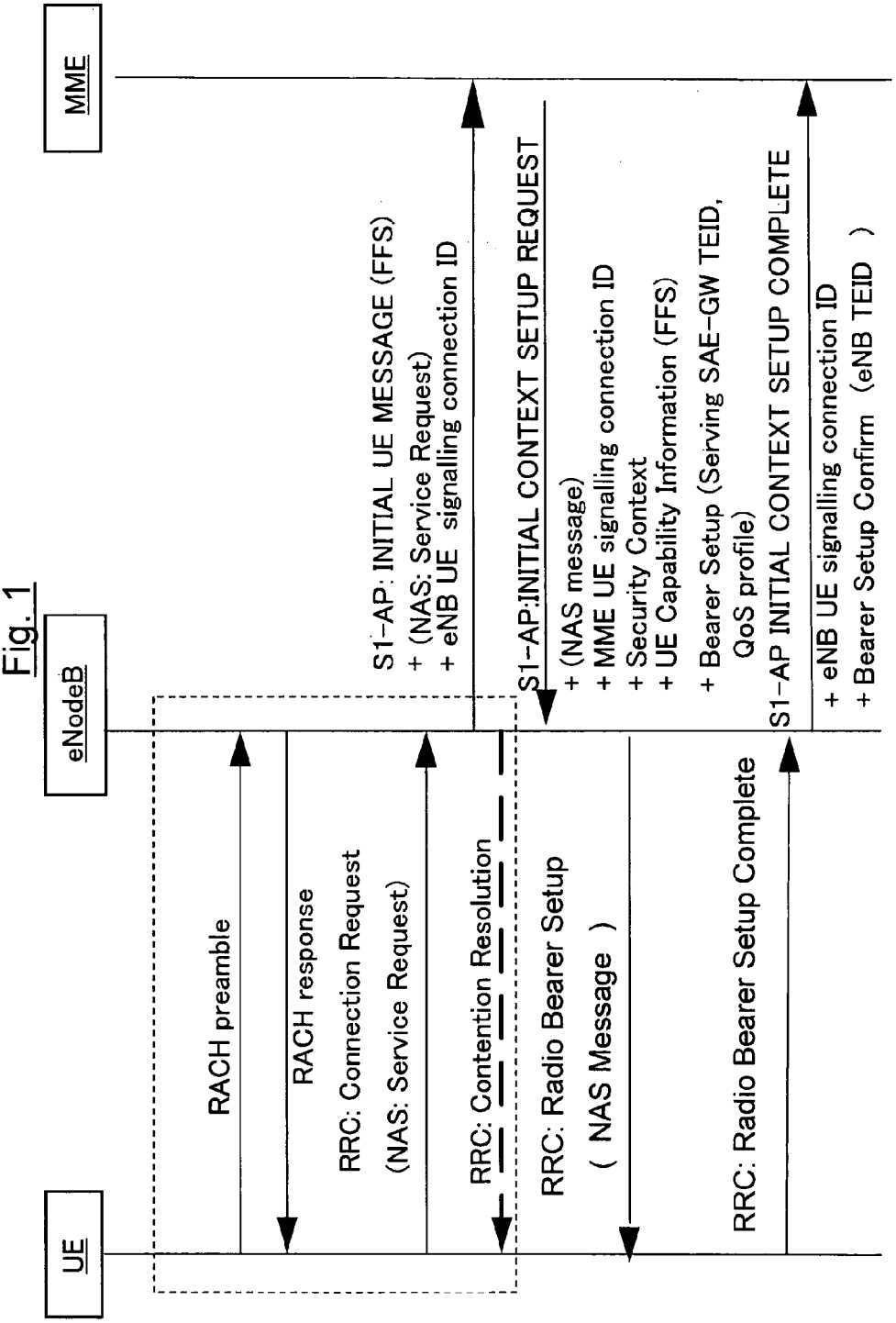

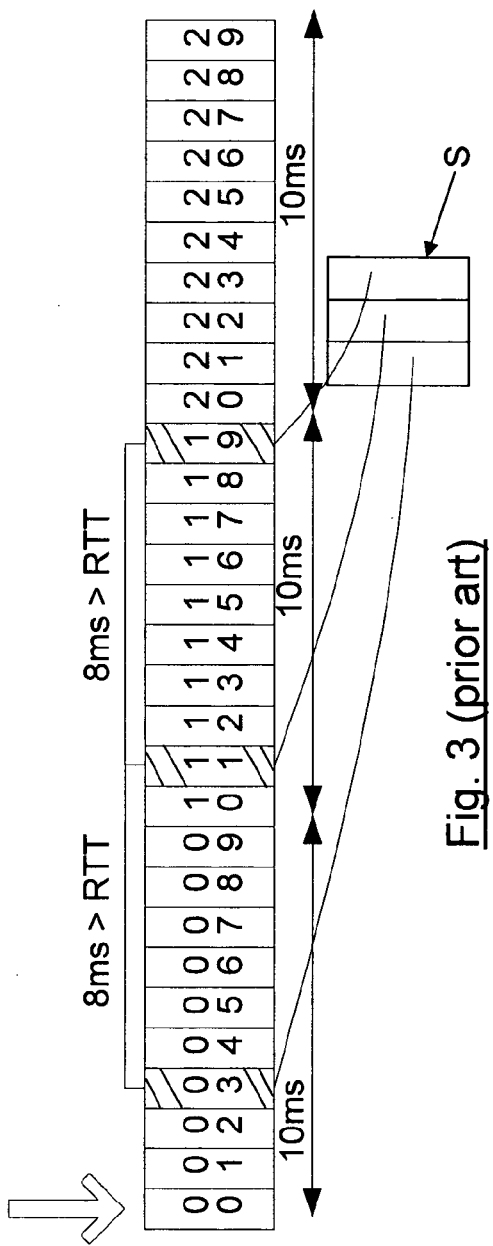
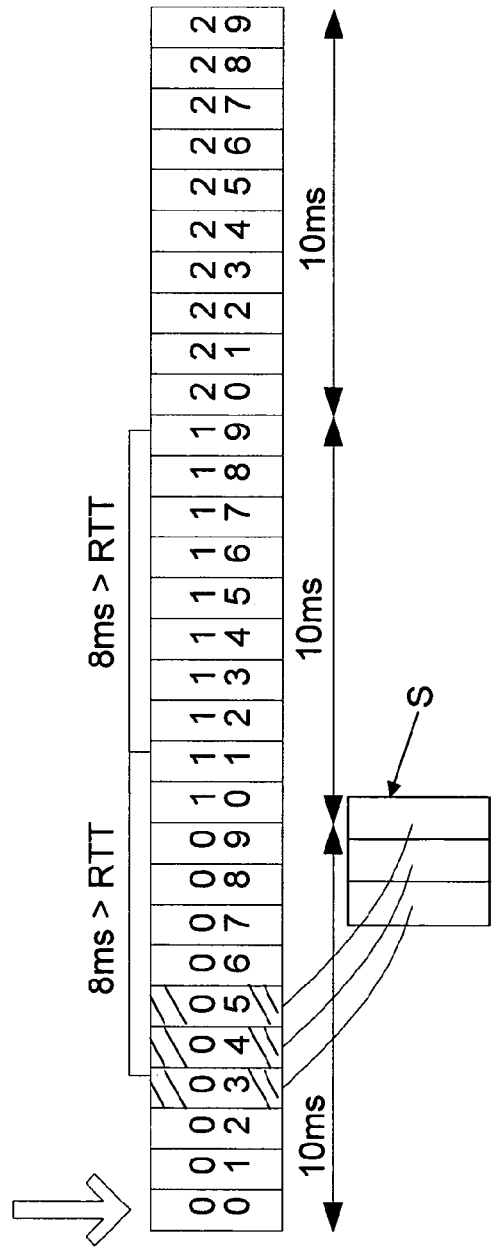
Fig. 3 (prior art)
Fig. 4

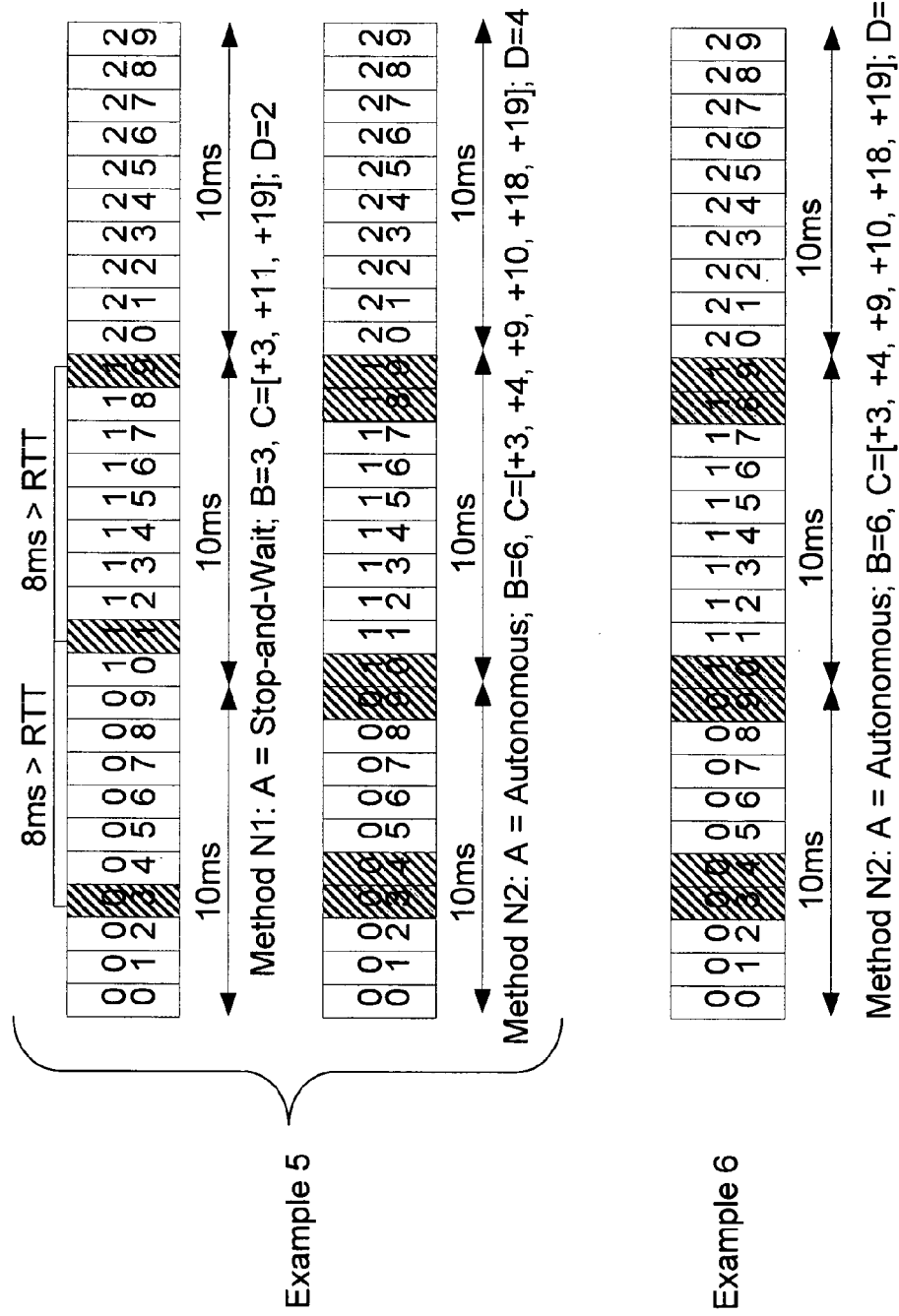

PRESCHEDULED RETRANSMISSION FOR INITIAL ESTABLISHMENT

TECHNICAL FIELD

The present invention relates to a method for a wireless communications network for data packet communication. The communications network comprises a user equipment and a transceiver node. The user equipment and the node inter communicates over an air interface communication link. The user equipment transmits a first message in a first scheduled transmission in a random access procedure during setup of the communication link. The invention also relates to a wireless communications network for data packet communication.

BACKGROUND

Abbreviations
ACK Acknowledgement
ARQ Automatic Repeat-reQuest
CBRA Contention Based Random Access
CCCH Common Control Channel
HARQ Hybrid ARQ
IP Internet Protocol
MAC Medium Access Control
MSG Message
NACK Negative ACK
NAS Non Access Stratum
RACH Random Access Channel
RB Radio Block
RLC Radio Link Control
RLC-AM RLC Acknowledge Mode
RRC Radio Resource Control
TEID
SAE-GW user plane node
TTI Transmission Time Interval
UL Uplink
VoIP Voice over IP The present invention refers to a system described in the project Long Term Evolution, LTE, which is a further development of 3GPP and is introduced in 3GPP Release 8. LTE uses Orthogonal Frequency Division Multiplexing, OFD; together with advanced antenna technologies. Existing 3GPP (GSM and WCDMA/HSDPA) and 3GPP2 (CDMA2000 1xRTT, EV-DO) systems are integrated to the LTE through standardized interfaces providing optimized mobility with LTE.

LTE is a data packet wireless communication systems for mobile user equipments such as computers and telephones or the like. Communication between the mobile user equipment and a second party in the system is done by routing data packets between nodes over data links in the system. In the following text "uplink" refers to communication from the user equipment to the second party and "downlink" refers to communication from the second party to the user equipment. In both the uplink and downlink direction, a message intended to be transmitted is broken down in the transmitting unit into a number of data packets being routed to and assembled by the receiving unit.

The mobile user equipment communicates over an air interface with a node in the form of a base transceiver station, eNodeB. The data packets are queued or buffered in the eNodeB for downlink communication and in the user equipment for uplink communication. When a buffered data packet is transmitted from the eNodeB or the user equipment, a so called HARQ (Hybrid Automatic Repeat-reQuest) process starts a timer with a set time interval. When the recipient, i.e. the user equipment or the eNodeB, receives the data packet it transmits an acknowledgement signal, ACK, back to the sender that transmitted the data packet and when the ACK is received the HARQ process stops and a new packet can be sent using the same HARQ process. However, if the ACK has not been received within the time interval, the HARQ process considers the data packet to have not been received and therefore signals to the sender to retransmit the data packet. In LTE the method of synchronous HARQ has been chosen against asynchronous HARQ. The motivation has been that since asynchronous HARQ implies that (re)transmissions for a certain HARQ process may occur at any time, the explicit signaling of the HARQ process number is required. With synchronous HARQ, that number can be derived from e.g. the sub-frame number.

In LTE it has also been agreed to use a Stop-and-Wait synchronous HARQ for uplink HARQ. This means that (re)transmissions for a certain HARQ process are restricted to occur at known time instants, in between which the sender stops and waits for ACK/NACK feedback from the receiver.

The queued or buffered data packets together with the above described Stop-and-Wait synchronous HARQ process result in a delay in the form of latency. Latency in a packet-switched network is normally referred to as a round-trip latency and is measured as the time for a one-way latency from source to destination plus a one-way latency from the destination back to the source, i.e. from the moment a packet is transmitted until the ACK has been received by the sender. The present invention refers to a non-trivial network, where a typical packet will be forwarded over many links via many nodes/gateways, each of which will not begin to forward the packet until it has been completely received. The minimal latency is the sum of the minimum latency of each link, plus the transmission delay of each link except the final one, plus the forwarding latency of each gateway.

Improved latency for connection establishment is an essential target of LTE standardization. As a result it is now the agreed assumption that certain Non Access Stratum, NAS, messages must either be concatenated with RRC messages or carried within RRC for its speedy transportation.

The eNodeB controls all active user equipments in a geographical area called a cell. When a user equipment is in an idle state, or is new in the cell, the eNodeB is not aware of the user equipment. When the user equipment wants to transmit uplink data packets, the first step is to become active, i.e. to become known to the eNodeB. The eNodeB always broadcasts system information comprising information about preambles. The user equipment becomes active by use of a Contention Based Random Access, CBRA, process or a Contention Free Random Access, CBRA, and the process starts with the user equipment transmitting to the eNodeB a Random Access Preamble comprising information about the user equipment. The eNodeB transmits a response in the form of a Random Access Response. After this the first scheduled transmission, hereinafter called MSG3, uses N-channel Stop-and-Wait synchronous HARQ as described above. Each HARQ (re)transmission adds incremental redundancy which the receiving side can use for soft combining to secure reception.

Since MSG3 is the very first L3 message, i.e. request to setup Radio Resource Control, RRC, it can not rely on Radio Link Control, RLC for segmentation since it must inevitably be sent on a logic Common Control CHannel CCCH which uses Radio Link Control Transparent Mode, RLC-TM. Thus, the only segmentation offered to the transmission of MSG3 is the one achieved by HARQ and therefore within MAC alone.

It is a result of the assumptions in 3GPP TR 36.300 V8.2.0 (2007-10) that the MSG3 size must be fixed. The current estimation is that MSG3 must be restricted to some 72 or alternatively 96 bits to achieve worst case coverage for cell border user equipments. In case the initial NAS upload message is larger than what such an MSG3 can provide, it needs to be split in two parts where the latter part is sent after CBRA has been successfully completed.

The problem here is multifold and needs to be addressed in its larger context.

Firstly, MSG3 needs to be of varying size because the CBRA procedure is a multi-purpose procedure and the required MSG3 size really depends on the purpose of each procedure that has triggered CBRA to occur, i.e. which content needs be transferred by each separate initial user equipment message. It is a waste of resources to have one fixed size.

Secondly, the latency must be optimized for certain scenarios while for other scenarios it does not need to. For cases which are not time-critical, there is no need to add such content to MSG3 which is not required for the proper user equipment identification, but rather that can follow after the CBRA procedure has been completed. Again, it is a waste of resources to have one fixed size.

Thirdly, the size of MSG3 must not be restricted so that messages that apply to time-critical scenarios would not fit. The connection establishment as described above is the main example of such a time-critical scenario. Here MSG3 must, for the optimal latency, house as Initial UE message one RRC Connection Request (which is terminated in the RAN layer) and one NAS: Service Request (which is terminated in layers above RAN).

Finally, only few bits of information have been exchanged at the time of MSG3 and moreover those have been exchanged over a common channel. The user equipment has with the Random Access Response received a fixed resource assignment in the time-frequency domain for MSG3 transmission. It has not learned much of which exact power is the adequate one to reach the RBS and must use approximately the same power it used to transmit the preamble. Since, according to the current 3GPP assumptions, the resource is a fixed-size one, the user equipment (UE) which has the worse channel to reach the RBS will need to retransmit more times than that with a better.

While the method of N-channel Stop-and-Wait Synchronous HARQ serves its purpose as an efficient method to secure uplink transmission whenever a connection has been established, it fails as an efficient method for the most swift and secure establishment of such a connection. The Stop-and-Wait method ensures that incremental redundancy is added to the transmission, but at the cost of an approximate order of one round-trip delay alongside each retransmission. This in turn limits the maximum size of MSG3. It is the current 3GPP assumption that the secure transmission of MSG3 requires in average an approximate total of 3-4 transmissions which in turn limits the MSG3 size to some 72-96 bits. Needless to say, 3GPP has for a lengthier time been and is still in a lengthy deadlock debate, involving complex inter-work between several RAN groups, as well as towards CT and SA groups, how to squeeze the content of MSG3, with the risk of loosing functional content.

It is therefore an object of the invention to find a faster setup of a communication link in a Random Access process allowing an adjustable size of the MSG3.

SUMMARY

The invention intends to remedy the above mentioned deficiencies in order to find a faster setup of a communication link in a wireless communications network for data packet communication. The communications network comprises a user equipment and a transceiver node. The user equipment and the node inter-communicate over an air interface communication link. The user equipment transmits a first message in a first scheduled transmission in a random access procedure during setup of the communication link, wherein resources for the transmission has been indicated in a random access preamble previously sent in the same random access procedure. The invention is characterized in that, based on a pre-scheduled scenario indicated by the preamble. The first message is transmitted in a first sub frame and retransmitted in at least a second sub frame within a first roundtrip time in a first HARQ-process triggered by the transmission of the first message in the first sub frame.

The step of transmitting the first message in the first sub frame and in at least the second sub frame within the first roundtrip time will hereinafter be referred to as prescheduled retransmission.

The basic concept of this invention is bi-fold. Firstly, it aims to add a few distinctive details to a method that joined with known technology distinguish time-critical scenarios and based on that decides how MSG3 shall be transmitted. And secondly it aims to introduce the method of prescheduled retransmissions as a method for MSG3 transmission and propose it to be used for time-critical scenarios or for that purpose any scenario which involves the transmission of MSG3. A time critical scenario could occur during a handover, i.e. when the user equipment performs moves from one transceiver node to another. Another example is when the user equipment transitions from idle to active state.

The prescheduled retransmission according to the present invention enables a quick transmission of incremental redundancy without the latency cost inherent in the prior art method, since it has no need to stop-and-wait for feedback. As such the method has the potential to more swiftly add incremental redundancy for the secure transmission of MSG3 and by that shorten the lead-time for time-critical MSG3 transmissions.

MSG3 is a fictitious name denoting a collective of all possible messages sent in this first scheduled transmission. The first message "MSG3" refers to a message that is defined on a higher layer, for example RRC or MAC, than the physical transmission layer.

The prescheduled retransmission of the first message is essential to achieve the flexibility required to handle time-critical scenarios alongside less time-critical. The invention also introduces the idea that random access preambles shall be split into groups in such a way that a method to transmit is associated to each such group. The preambles are divided into at least a first group and a second group, where the first group is associated to the inventive prescheduled scenario for transmitting the first message at least twice within the first round trip time. The second group can be dedicated to a different scenario or to the scenario known in prior art allowing only stop-and-wait scenarios for the HARQ process. However, the optimal application of the idea is to split preambles into N=1 groups, hence always use the prescheduled retransmission of the first message. The trunking efficiency of one common pool of resources is known to be greater than that of a fragmented pool. The random access preamble pool of LTE may already fragment for other purposes. Normally a fully commercial LTE system will also support Contention Free Random Access (a method named Non-contention based RA in E-UTRAN; Overall description; Stage 2 (Release 8) 3GPP TR 36.300 V8.2.0 (2007-10) in which a dedicated preamble is reserved for one user equipment).

According to the invention, the user equipment transmits a random access preamble to the node before the first message is transmitted. As stated above, the random access preambles are divided into groups. Each group is associated to selected transmission occasions. Each group may also be associated with a selected size of the first message associated to each group.

It is to be understood that a certain high priority preamble allows for the user equipment to transmit larger first messages compared to first messages associated to preambles with lower priority. Here, "priority" advantageously refers to time critical scenarios or other scenarios where the inventive prescheduled scenario can be used.

According to the invention, the transceiver node comprises a scheduler for handling at least the first group of preambles associated with the prescheduled scenario instructing the user equipment to transmit the first message in the first sub frame and to retransmit the first message in the second sub frame within the first roundtrip time in the first HARQ-process triggered by the transmission of the first message in the first sub frame, i.e. to use the prescheduled retransmission scenario. The scheduler can also be arranged for handling all types of groups of preambles.

According to the invention, all scheduled transmission of the first message MSG3 occurs within the first RTT for at least one of the groups.

For any of the groups, the scheduled transmission of the first message MSG3 may extend beyond the time range of the first RTT.

Furthermore, the preambles can be use both for contention based random access, CBRA, and for contention-free random access, CFRA, or as 3GPP standard says, non-contention based random access. Hence, the preambles can be divided into two categories, one for CBRA and one for CFRA.

When CBRA is used, information on the group of preambles available for CBRA are launched (broadcasted) by the transceiver node, for example eNodeB, in such a way that the full community of UEs is addressed at the same time. The user equipment then selects a preamble from the group and participates in a contention in a CBRA. The user equipment selects the preamble in a randomized way with the aim to distribute the selections so that not all contenders use one and the same preamble. This is different from the CFRA preamble because in CFRA the user equipment does not select the CFRA preambles but the transceiver node, (for example eNodeB) selects and dedicates the preamble to the user equipment. The preambles used for CFRA are assigned explicitly by the transceiver node, for example eNodeB, dedicated for one user equipment to use for the contention-free random access process.

Hence, the user equipment selects a preamble for contention-based random access and the user equipment is assigned by the node to use a preamble for contention-free random access. The user equipment then transmits the selected or assigned preamble to the node and receives a Random Access Response from the node. The preamble is used by the user equipment when transmitting the first scheduled message for distinguishing the size and the selected transmission occasions associated to the preamble group.

The user equipment selects or is being assigned the preamble and transmits the preamble from one of the groups according to its associated transmission occasions and size based on the type of message it has to transmit in the first scheduled transmission. The size and selected transmission occasions are advantageously associated to time-critical scenarios.

According to the invention, the first sub frame is prior in time to the second sub frame. Furthermore, the first sub frame and the second sub frame may advantageously be arranged in a consecutive order or may be arranged in a non-consecutive order. Both alternatives give the advantage with shortened latency. Here, "consecutive" refers to directly following each other. Hence, the sub-frames in a consecutive transmission scheme refer to sub-frames being arranged immediately next to each other. In line with this reasoning, "non-consecutive" refers to one sub-frame used for transmitting the first message being separated by a sub-frame from a second sub-frame being used for retransmission of the first message. It should be noted that a combination of consecutive and non-consecutive is allowed. For example, the first message is transmitted in a first sub-frame and in a second sub-frame being separated from the first sub-frame by at least one sub-frame and then the first message is transmitted in at least a third sub-frame following directly after the second sub-frame, within the first round trip time. All such combinations are possible within the scope of the invention.

As mentioned before, the transmission of the first message triggers a corresponding HARQ-process, advantageously comprising a stop-and-wait function according to prior art. However, the HARQ process may be synchronous or asynchronous which gives different calculations for the round trip time. It should be noted that a corresponding HARQ process starts in the transceiver node.

It is known that the node creates a sum of energy levels from the received first messages for data processing of further data packets transmitted from the user equipment. The prescheduled retransmission gives the advantage that the sum of energy levels increases faster than for prior art methods since the first message is transmitted at least a second time within the first round trip time.

Upon reception of the random access preamble, the node transmits a random access response to the user equipment before the first message is transmitted. The random access response comprises scheduling information to the user equipment based on the type of preamble selected by the user equipment. The scheduling information triggers the user equipment to transmit the first message in the first scheduled transmission at least twice within the first roundtrip time in the first HARQ process. The scheduling information decides how many times the user equipment shall transmit the first message within the first roundtrip time in the first HARQ process.

BRIEF DESCRIPTION OF THE DRAWINGS

The invention will below be further described in connection to a number of drawings, in which:

FIG. 1 schematically shows Connection Establishment Idle-to-Active procedure according to the invention;

FIG. 3 schematically shows a Stop-and-Wait Synchronous HARQ process according to prior art;

FIG. 4 schematically shows a prescheduled retransmission according to the invention involving a Stop-and-Wait HARQ-process;

FIG. 6 schematically shows examples 3 and 4 according to the invention of a Transmission scheme involving a HARQ-process, and in which;

FIG. 7 schematically shows examples 5 and 6 according to the invention of a Transmission scheme involving a HARQ-process.

DETAILED DESCRIPTION

Figure 2B:
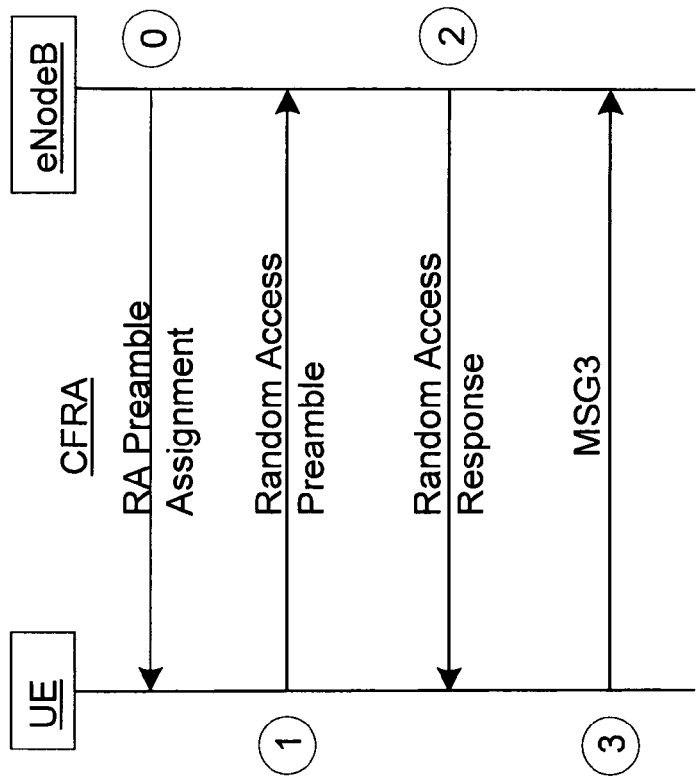
FIG. 2b schematically shows a signalling sequence for a contention free random access procedure according to the invention according to the invention.

FIG. 1 schematically shows a process scheme for connection establishment of a user equipment (hereinafter called UE) to a transceiver node (hereinafter called eNodeB or eNB) when the UE switches from an idle state to an active state according to prior art. The events in the dotted square will be explained in connection to FIG. 2.

FIG. 1 shows that certain NAS messages may be either concatenated with RRC messages or carried within RRC due to its speedy transportation. FIG. 1 shows that after the eNodeB has received an RRC Connection Request and a NAS Service request, the eNodeB transmits a message to a control node Mobility Management Entity (hereinafter called MME) comprising S1-AP=Initial UE message (FFS) and the NAS Service Request and an eNodeB to UE signalling connection ID (IDentity). When the MME has received the message from the eNodeB, the MME transmits a message to the eNodeB comprising S1-AP=Initial Context setup request and NAS message and MME to UE signalling connection ID and security context and UE capability information (FFS) and bearer setup (Serving SAE-GW TEID, QoS profile.)

Modern cellular packet-switched communication systems such as HSPA (High Speed Packet Access) and LTE (Long Term Evolution), both specified in the 3GPP, employ a Hybrid ARQ (Automatic Repeat ReQuest) protocol in their respective MAC (Medium Access Control) layer. The basic functionality of the HARQ protocol is to correct block errors that occur over the air interface.

The HARQ protocols specified in LTE and HSPA utilize so-called HARQ processes to transfer the data. The HARQ processes are used to associate a potential retransmission to its original transmission in order to enable soft combining at the HARQ receiver. Only when the HARQ receiver has reported correct reception of the data sent on a HARQ process may it be used to transmit new data. Consequently, before the reception of a HARQ status report from the receiver, the HARQ sender can not know whether it should send new data or a retransmission of the "old data". In the meantime, it therefore, "stops and waits" (hence the name) until it knows the result of the transmission. In order to still be able to utilize the link during these waiting periods, it is customary to use multiple parallel such HARQ processes.

Further, two main HARQ protocol modes exist:
1. synchronous HARQ, where potential retransmissions occur at a pre-determined time after the initial transmission. In this case, no HARQ process number needs to be transmitted, since the process number is implicitly identified by the time of its transmission. This type of operation has been chosen for the LTE uplink HARQ protocol.
2. asynchronous HARQ, where there is no strict timing relationship between a transmission and its retransmission. Instead, the HARQ process numbers are explicitly signaled in each information block. This type of operation has been chosen for the LTE downlink HARQ protocol.

It has been the further agreed assumption in 3GPP TR 36.300 V8.2.0 (2007-10) that N-channel Stop-and-Wait synchronous HARQ is used for uplink HARQ. Essentially what this means is that (re)transmissions for a certain HARQ process are restricted to occur at known time instants, in between which the sender stops and waits for ACK/NACK feedback from the receiver.

The method of synchronous HARQ has been chosen against asynchronous HARQ. The motivation has been (see Physical layer aspects for evolved Universal Terrestrial Radio Access (UTRA) (Release 7) 3GPP TR 25.814 V7.1.0 (2006-10)) that since asynchronous HARQ implies that (re)transmissions for a certain HARQ process may occur at any time, the explicit signaling of the HARQ process number is required. With synchronous HARQ, that number can be derived from e.g. the sub-frame number. However, the present invention can be used also for an asynchronous HARQ.

Each HARQ process is associated with a HARQ buffer.

Each HARQ process shall maintain a state variable CURRENT_TX_NB, which indicates the number of transmissions that have taken place for the MAC PDU currently in the buffer. When the HARQ process is established, CURRENT_TX_NB shall be initialized to 0.

In case of dynamically scheduled transmissions, the UE is configured with a maximum number of transmissions that is identical across all HARQ Processes and all Logical Channels.

If the HARQ entity provides a new PDU, the HARQ process shall:
    set CURRENT_TX_NB to 0;
    set CURRENT_IRV to 0;
    store the MAC PDU in the associated HARQ buffer;
    generate a transmission as described below.

If the HARQ entity requests a re-transmission, the HARQ process shall:
    if an uplink grant for this was received on [PDCCH]:
    set CURRENT_IRV to the value indicated in the uplink grant;
    generate a transmission as described below.

To generate a transmission, the HARQ process shall:
    instruct the physical layer to generate a transmission with the redundancy version corresponding to the CURRENT_IRV value and the transmission timing;
    if CURRENT_IRV<[Y] [FFS]:
    increment CURRENT_IRV by 1;
    increment CURRENT TX NB by 1;

The HARQ process shall:
    if a HARQ ACK is received; or
    if CURRENT_TX_NB≧maximum number of transmissions configured:
    flush the HARQ buffer.

The HARQ process shall also:
    if CURRENT_TX_NB=maximum number of transmissions configured; and
    no HARQ ACK is received for this process:
    notify the relevant ARQ entities in the upper layer that the transmission of the corresponding RLC PDUs failed.

Figure 2A:
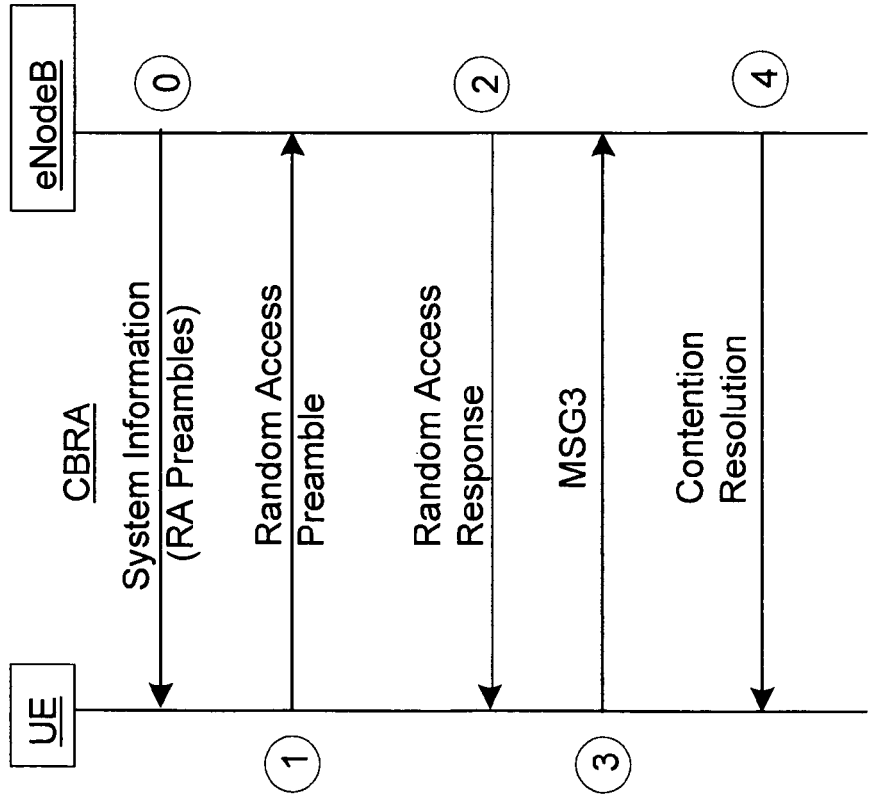
FIG. 2a schematically shows a signalling sequence for a contention based random access procedure according to the invention according to the invention.

FIG. 2a schematically shows a signalling sequence for a contention based random access, CBRA, procedure according to the invention. The procedure is marked in FIG. 1 with a square having dotted lines. It is the agreed assumption in 3GPP TR 36.300 V8.2.0 (2007-10) that the first scheduled transmission (step 3 in FIG. 2, henceforth referred to as MSG3) uses such N-channel Stop-and-Wait synchronous HARQ as described above. Each HARQ (re)transmission adds incremental redundancy which the receiving side can use for soft combining to secure reception. It should be noted that the prescheduled retransmission according to the invention can be applied also on an asynchronous HARQ process.

Since MSG3 is the very first L3 message, i.e. request to setup RRC, it can not rely on RLC for segmentation, because it must inevitably be sent on a logical CCCH which uses RLC-TM. Thus, the only segmentation offered to the transmission of MSG3 is the one achieved by HARQ and therefore within MAC alone.

It is the result of the assumptions above that the MSG3 size must be fixed. The current estimation is that MSG3 must be restricted to some 72 or alternatively 96 bits to achieve worst case coverage for cell border UEs. In case the Initial NAS UL message is larger than what such a MSG3 can provide, it needs be split in two parts where the latter part is sent after CBRA has been successfully completed.

The problems with the existing solutions have been discussed in the above described background.

FIG. 2b schematically shows a signalling sequence for a contention free random access, CFRA, procedure according to the invention. One difference between the CBRA in FIG. 2a and CFRA in FIG. 2b is that the process associated to CBRA comprises the step of broadcasting information on a group of preambles from which one is to be randomly selected by the user equipment UE but that the process associated to CFRA comprises the step of the node eNodeB assigning a preamble to the user equipment UE. Another difference is that in CFRA there is no contention resolution as in step 4 in FIG. 2b.

Both FIGS. 2a and 2b shows steps 0 to 3 but in FIG. 2a the transceiver node eNodeB broadcasts system information to the user equipment comprising information on available RA Preambles that the user equipment UE can use when selecting the preamble and in FIG. 2b the transceiver node eNodeB transmits a RA Preamble assigned to the user equipment UE.

The random access preambles are divided into groups. Each group is associated to selected transmission occasions. Each group may also be associated with a fixed size of the first message MSG3. It is to be understood that a certain (high priority) preamble allows for the UE to transmit larger first messages compared to other (lower priority) preambles.

Common for both FIGS. 2a and 2b is that the eNodeB controls all active user equipments in a geographical area called a cell. When a user equipment is in an idle state, or is new in the cell (for example handover), the eNodeB is not aware of the user equipment. When the user equipment wants to transmit uplink data packets, the first step is to become active, i.e. to become known to the eNodeB. The user equipment becomes active by use of a Contention Based Random Access, CBRA, process or a Contention Free Random Access, CFRA and the process starts with the user equipment transmitting to the eNodeB a Random Access Preamble, step 1, comprising information about the user equipment. The eNodeB transmits a response in the form of a Random Access Response, step 2. After this the first scheduled transmission, hereinafter called MSG3, uses N-channel Stop-and-Wait HARQ as described above, step 3. Each HARQ (re)transmission adds incremental redundancy which the receiving side can use for soft combining to secure reception. FIG. 2a shows step 4 which comprises a contention based resolution for the CBRA. Step 4 is evidently not necessary in a CFRA.

In MSG 3 the UE provides the eNodeB with information the UE unique identity. The eNodeB uses the information to resolve the contention in case several UEs have randomly selected and transmitted the same CBRA preamble during the same time period. In case of CFRA, the eNodeB already possesses information about the identity of the UE that is assigned a CFRA preamble. Therefore, the MSG3 with its content is not strictly needed in CFRA random access procedure. The first scheduled transmission could be other types of data. Albeit not necessary, MSG3 may still be wanted, in order to avoid any mistakes, e.g. due to the CFRA preamble being incorrectly detected. The future standard may stipulate whether MSG3 shall be transmitted in the CFRA procedure or not. It is also possible the two alternatives are available and the random access response instructs the UE whether to provide its unique identity in MSG3 or whether to start scheduled transmission of other data immediately. It should be noted that the numbers 0-4 in the sequence is not important for the invention. Hence, the steps could be numbered 1-5 or any other suitable denotation.

FIG. 3 schematically shows a Stop-and-Wait Synchronous HARQ process according to prior art.

As described in E-UTRAN; Overall description; Stage 2 (Release 8) 3GPP TR 36.300 V8.2.0 (2007-10), the UE receives an initial UL grant in the Random Access Response (step 2 in FIGS. 2a and 2b). This alongside an explicit Timing Alignment correction and either explicit or implicit information (not yet fully defined by LTE standard) on the time validity of that grant, i.e. when in time the opportunities to transmit and retransmit occurs, defines an exact series of uplink sub-frames, adding up to a sub-frame space of size S.

The sub-frames are disjunctive when using the method of Stop-and-Wait Synchronous HARQ, since each sub-frame in prior art must be spaced more than the rough Round Trip Time RTT apart from the next.

FIG. 4 schematically shows a prescheduled retransmission in a HARQ-process according to the invention. Here "prescheduled retransmission" refer to the transmission of several first messages MSG3 within a Round Trip Time RTT being triggered by the first transmission of the first message in a sub frame TTI=03.

According to one embodiment of the invention, the prescheduled retransmission with incremental redundancy is used to transmit the first message, MSG3. By employing that method, the same amount of sub-frame space S can be bundled to occur in any set of sub-frames, the fastest one being that which uses subsequent sub-frames that occur immediately next to each other. In FIG. 4, there is three sub frames TTI=03; TTI=04 and TTI=05 being bundled to form the sub-frame space S. Here "bundled" means that the sub-frames are arranged in a consecutive order i.e. follow directly after each other. However, in a different embodiment the sub-frames are arranged in a non-consecutive order, i.e. the sub-frames do not follow directly after each other. The latter embodiment will be explained further below.

One advantage of the invention is improved latency because of the quick prescheduled retransmission, i.e. the different transmissions, for example in the form of bundling, i.e. consecutively arranging, TTI=03; TTI=04 and TTI=05 within the RTT. Moreover, it is the more general method since it also incorporates any sub-frame space S and associated delay that can possibly be the result of the Stop-and-Wait method. Furthermore, the method of prescheduled retransmission also waits for feedback but it does not stop to wait for that.

Some additional references to existing technology will now be discussed in order to describe the invention. It is currently expressed in E-UTRAN; Overall description; Stage 2 (Release 8) 3GPP TR 36.300 V8.2.0 (2007-10) that:

Random Access Preamble on RACH in uplink:
  6 bits to carry: a 5 bit random ID, and 1 bit to indicate information on size of message 3 or requested resource blocks (FFS) limited by radio conditions. The groups of signatures that are used for indicating the 1 bit information, as well as necessary thresholds are broadcast on system information.

An interpretation of the above (and what is to some extent known and not part of the invention) is as follows. Each cell provides 64 different random access preambles per RACH. The transmission/reception of one of these 64 different preambles is the same as the transmission/reception of one bit pattern among the 64 different ones. This is equivalent to an identification using 6 bits. It says that five (5) of these bits constitutes a random ID while the remaining 1 bit does not. This shall be interpreted as if the 64 preambles are split in two groups. The broadcasted system information of each cell defines which are the preamble sequences and also in which two groups they are divided. Each UE must read this information in order to access the system. It follows that the UE in its random access preamble (step 1 in FIG. 2a) may implicitly indicate a purpose by selecting from either of these two sets. It has been and is debated in 3GPP what this purpose shall be, i.e. which information shall be carried by the 1 bit 'set-selector'. With the current wording of E-UTRAN; Overall description; Stage 2 (Release 8) 3GPP TR 36.300 V8.2.0 (2007-10), one FFS purpose shall be the size of MSG3 and another FFS purpose is to identify the radio conditions. The bit is occasionally referred to as the size/quality bit, indicating the desire to indicate both of purposes, e.g. if the UE needs a larger grant for MSG3 transmission AND the radio conditions as deemed by UE are good enough to handle such a larger grant. There have been contributions in 3GPP that suggest the 1 bit should be used to indicate urgency vs non-urgency. All this is here noted to be known.

It has been suggested to use the 1-bit to implicitly signal either of size, quality, size-quality and urgency. If size, the 1-bit is plainly used to signal which is the desired MSG3 size. If quality, the 1-bit is used to signal the radio conditions as experienced by the UE. If urgency, the 1-bit is rather used to indicate the urgency associated to the content to MSG3. It should be noted that the CBRA procedure as depicted in FIG. 2a is a procedure that terminates in the lower layers (MAC and below) of the RAN network. Size and quality is indeed something within scope, control and grasp of those RAN layers, but it remains complex for them to decide upon its combination. Urgency, on the other hand is far beyond the comprehension of those RAN layers. Since they do not terminate neither of RRC and NAS, they can not distinguish what RRC and NAS one MSG3 transports from another.

In one embodiment of this invention the 1-bit (or more generally log 2(N) bits if all available preamble sequences are split in even N groups) should be used to signal which among the available methods UE desires to physically transmit MSG3. In contrary to complex parameters such as urgency or combinations of size/quality, the method by which the physical channel transmits is within the grasp and scope of the involved RAN layers to understand.

In this embodiment of the invention, the available transmission methods are categorized in such a way that each Nth group is attributed one method, uniquely defined by:
A) Prescheduled Retransmission or Stop-and-Wait Retransmission
B) Maximum number of transmission opportunities
C) TTI Bundling
D) Uplink Grant Neither the details of these attributes nor in what exact way UE learns about the attributes are vital to the invention. The detailed attributes are most probably partly implicit and defined by standard specification and partly explicitly signalled alongside each Nth group by broadcasted system information It should be noted that should N=1, there is only one method. The preambles then do not need to be split since there is no need for the 1-bit and hence the "signal" in that case is implicit.

Figure 5:
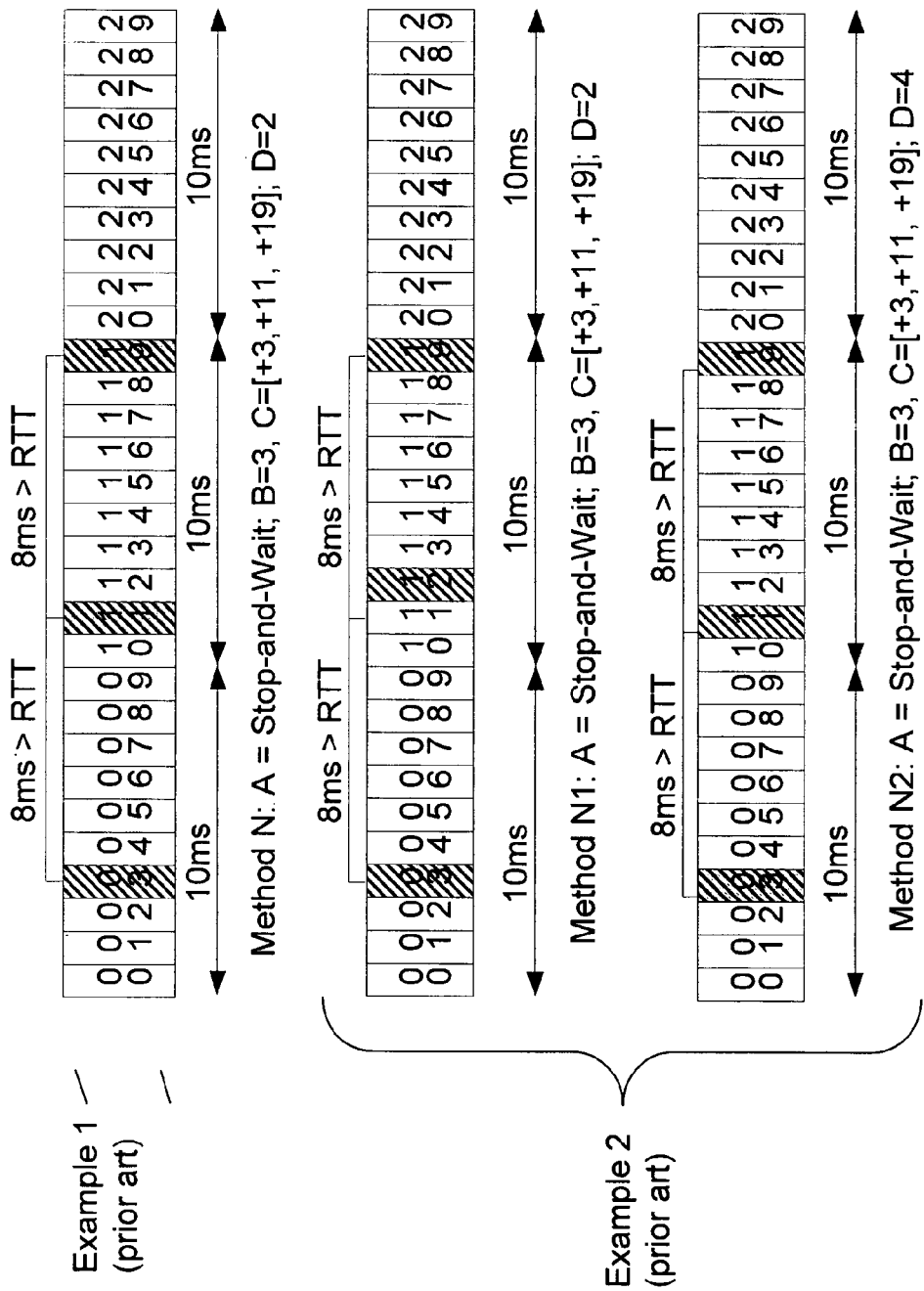
FIG. 5 schematically shows examples 1 and 2 according to prior art of a Transmission scheme involving a HARQ-process.
Figure 6:
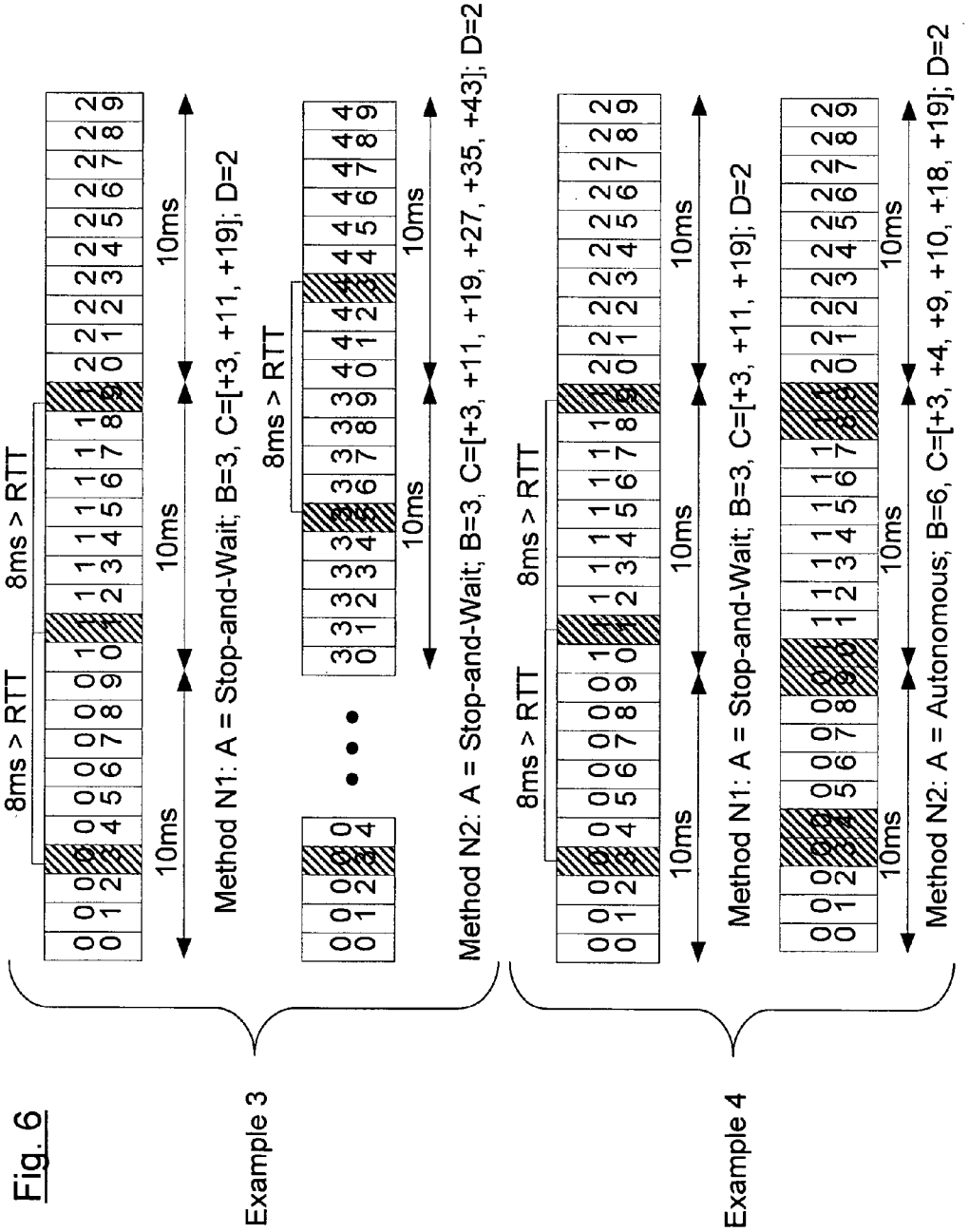

For the purpose of exemplifying this embodiment six examples of grouping are presented in connection to FIGS. 5-7. It will below be described how a transmission method is defined by a set of attributes associated to each group of preambles. In each example, it is assumed that the first transmission opportunity for MSG3 transfer is the same for each group and that it occurs 3 sub-frames ahead of the point in time when the UE receives the grant assignment (in step 2 of FIGS. 2a and 2b).

EXAMPLE 1

N=1 Groups, Only Stop and Wait (Prior Art)

N=1 groups. All preambles in group N are associated to the Method N.

Method N: A=Stop-and-Wait. B=Maximum 3 transmission opportunities, C=[+3,+11,+19], i.e. bundled 8 sub-frames apart (evenly and sufficiently spaced to cater for one round-trip delay), D=2 RBs/TTI The UE must adopt the size of MSG3 payload to fit into the fixed size associated to method N. It selects a preamble from Group N. What does not fit into MSG3 must wait until a later and separate transmission occasion (urgent and no urgent makes no difference). This example corresponds to the current assumption in E-UTRAN; Overall description; Stage 2 (Release 8) 3GPP TR 36.300 V8.2.0 (2007-10) with the difference that preamble sequences are not split into two groups, and hence that the 1-bit indication is not used

EXAMPLE 2

N=2 Groups, Only Stop and Wait (Prior Art)
Preambles in Group N1/N2 are Associated to Method N1/N2 Respectively.

Method N1: A=Stop-and-Wait. B=Maximum 3 transmission opportunities, C=[+3,+11,+19], i.e. bundled 8 sub-frames apart (evenly and sufficiently spaced to cater for one round-trip delay),
D=2 RBs/TTI.
Method N2: A=Stop-and-Wait. B=Maximum 3 transmission opportunities, C=[+3,+11,+19], i.e. bundled 8 sub-frames apart (evenly and sufficiently spaced to cater for one round-trip delay), D=4 RBs/TT UE must adopt the size of MSG3 payload to fit into either of the fixed sizes associated to methods N1 or N2. What does not fit into such a MSG3 must wait until later and separate transmission (urgent and no urgent makes no difference). The UE1 that has a MSG3 payload P1 that fits into the fixed size associated to method N1 selects a preamble from group N1. The UE2 that has a larger MSG3 payload P2 selects one from N2. Given that admission is granted and depending on if the radio conditions of UE2 are sufficiently good, its MSG3 payload P2 may be twice the size of P1, with no additional delay. This example corresponds to the current assumption in E-UTRAN; Overall description; Stage 2 (Release 8) 3GPP TR 36.300 V8.2.0 (2007-10). It is debated that likely the larger of these payloads, P2, will not be large enough to house all functional content of time-critical cases of MSG3. The discussions how to handle network admission of such grant requests has not been finalized (e.g. if P2 can not be granted it is not clear how to resolve the situation, since UE2 would not be satisfied with P1).

With this approach a larger MSG3 payload can only be transmitted if UE2 has good radio conditions. If UE2 has poor radio conditions, MSG3 payload needs to be decreased to fit into the size provided by method N1

EXAMPLE 3

N=2 Groups, Only Stop and Wait, Increased Number of Transmissions.

Preambles in group N1/N2 are associated to Method N1/N2 respectively.

Method N1: A=Stop-and-Wait. B=Maximum 3 transmission opportunities, C=[+3,+11,+19], i.e. bundled 8 sub-frames apart (evenly and sufficiently spaced to cater for one round-trip delay), D=2 RBs/TTI.

Method N2: A=Stop-and-Wait. B=Maximum 6 transmission opportunities, C=[+3,+11,+19,+27,+35,+43], i.e. bundled 8 sub-frames apart (evenly and sufficiently spaced to cater for one round-trip delay), D=2 RBs/TTI With this configuration, a UE can transmit twice the amount of data with method N2 compared to method N1, regardless of whether the radio channel quality is good or bad. The UE2 with large MSG3 payload selects a preamble from group N2. If its radio channel quality is good, the UE2 will only need to transmit the message a few times, whereas if its radio channel quality is poor, it will need to use all 6 occasions. This means that UEs with good radio channel quality will experience low latency, whereas UEs with poor radio channel quality will experience larger latency.

EXAMPLE 4

N=2 Groups, Stop-and-Wait and Prescheduled Retransmission.

Preambles in group N1/N2 are associated to Method N1/N2 respectively.

Method N1: A=Stop-and-Wait. B=Maximum 3 transmission opportunities, C=[+3,+11,+19], i.e. bundled 8 sub-frames apart (evenly and sufficiently spaced to cater for one round-trip delay), D=2 RBs/TTI.

Method N2: A=prescheduled retransmission, B=Maximum 6 transmission opportunities, C=[+3,+4,+9, +10, +18,+19] (or any bundle assignment starting 3 sub-frames ahead, no need to cater for round-trip delay between any of these opportunities), D=2 RBs/TTI With this configuration, a UE can transmit twice the amount of data with method N2 compared to method N1, regardless of whether the radio channel quality is good or bad. The UE2 with large MSG3 payload selects a preamble from group N2. If its radio channel quality is good, the UE2 will only need to transmit the message a few times, whereas if its radio channel quality is poor, it will need to use all 6 occasions. However, since method N2 employs prescheduled retransmission, the number of retransmissions does not scale with a rough RTT, and thus the latency is not increased compared to method N1. The cost associated to this configuration is less efficient UL transmissions since the UE does not stop and wait for HARQ feedback before a re-transmission.

EXAMPLE 5

N=2 Groups, Stop-and-Wait and Prescheduled Retransmission.

Preambles in group N1/N2 are associated to Method N1/N2 respectively

Method N1: A=Stop-and-Wait. B=Maximum 3 transmission opportunities, C=[+3,+11,+19], i.e. bundled 8 sub-frames apart (evenly and sufficiently spaced to cater for one round-trip delay), D=2 RBs/TTI.

Method N2: A=prescheduled retransmission, B=Maximum 6 transmission opportunities, C=[+3,+4,+9, +10, +18,+19] (or any bundle assignment starting 3 sub-frames ahead, no need to cater for round-trip delay between any of these opportunities), D=4 RBs/TTI The UE1 that has a MSG3 payload P1 which fits into the fixed size associated to method N1 selects a preamble from group N1. The UE2 that has a larger MSG3 payload P2 (as in case of UE1, higher layers of UE2 has decided no part of MSG3 payload can wait until after CBRA) selects one from N2. By doing that, UE2 will adopt dynamically and decide which of the allowed transmission opportunities it will need to use. If UE2 shares the exact radio conditions of UE1, its MSG3 payload P2 may be four times the size of P1, with no additional delay (twice the size of the larger grant in Example 2 above)

EXAMPLE 6

N=1 Groups, Only Prescheduled Retransmission
N=1 Groups. All Preambles in Group N are Associated to the Method N.

Method N: A=prescheduled retransmission, B=Maximum 6 transmission opportunities, C=[+3,+4,+9, +10, +18,+19] (or any bundle assignment starting 3 sub-frames ahead, no need to cater for round-trip delay between any of these opportunities), D=4 RBs/TTI UE adopts dynamically the flexible size of MSG3 payload to fit into the fixed size associated to method N.

UE will adopt dynamically and decide which of the allowed transmission opportunities it will need to use, depending on the size of MSG3. The 1-bit indication (generally worded the $\log_2(N)$-bits indication would not be required).

The invention is not limited to the shown examples, but any combination of consecutive or non-consecutive transmissions of the first message is allowed within the first roundtrip time.

The invention claimed is:

1. A method for a transceiver node in a wireless communication network for data packet communication, the method relating to a random access procedure by which a user equipment (UE) attempts an access to the communication network via the transceiver node, and comprising:
  receiving a preamble from the UE, wherein the preamble indicates one of at least two alternative scheduling scenarios for a subsequent scheduled message;
  receiving, in accordance with the one of the alternative scheduling scenarios; the message in a first subframe and in a second subframe within a roundtrip time (RTT), and initiating a hybrid automatic repeat request (HARQ) process when the message is received in the first subframe.

2. The method of claim 1, wherein the HARQ process comprises a stop-and-wait function.

3. The method of claim 1, further comprising creating, by the transceiver node, a sum of energy levels from a received message for data processing of further data packets transmitted by the UE.

4. The method of claim 1, wherein the preamble is a member of one of at least a first group and a second group, the first group is associated with a first size of the message, and the second group is associated with a second size of the message.

5. The method of claim 4, wherein at least the first group is associated with a set of transmission occasions for transmitting the message in the first subframe and in the second sub-frame within the RTT.

6. The method of claim 4, wherein at least the first group is associated with a set of transmission occasions for transmitting the message in additional subframes within the RTT.

7. The method of claim 1, further comprising transmitting, by the transceiver node upon receiving the preamble, a random access response to the UE before the message is received, wherein the random access response comprises scheduling information for the UE based on the one of the alternative scheduling scenarios.

8. The method of claim 7, wherein the scheduling information instructs the UE to transmit the message in a first scheduled transmission at least twice within the RTT in the HARQ process.

9. The method of claim 7, wherein the scheduling information indicates how many times the UE is to transmit the message within the RTT in the HARQ process.

10. A method for a user equipment (UE) to access in a random access procedure a wireless communication network for data packet communication that includes a transceiver node, the method comprising:
    transmitting a preamble that indicates one of at least two alternative scheduling scenarios for a subsequent scheduled message; and
    transmitting, in accordance with the one of the at least two alternative scheduling scenarios, the message in a first subframe and retransmitting the message in a second subframe within a roundtrip time (RTT); and
    initiating a hybrid repeat request (HARQ) process at transmission of the message in the first subframe.

11. The method of claim 10, wherein the HARQ process comprises a stop-and-wait function.

12. The method of claim 10, wherein the preamble is a member of one of at least a first group and a second group, the first group is associated with a first size of the message, and the second group is associated with a second size of the message.

13. The method of claim 12, wherein at least the first group is associated with a set of transmission occasions for transmitting the message in additional subframes within the RTT.

14. The method of claim 12, wherein at least the first group is associated with a set of transmission occasions for transmitting the message in the first subframe and in the second subframe within the RTT.

15. The method of claim 14, wherein, for any of the groups, scheduled transmission of the message extends beyond the RTT.

16. The method of claim 10, wherein, upon transmission of the preamble, the user equipment receives a random access response from the transceiver node before the first message is transmitted, and wherein the random access response comprises scheduling information to the user equipment (UE) based on the at least one of two alternative scheduling scenarios.

17. The method of claim 16, wherein the user equipment (UE) is instructed by the scheduling information to transmit the first message in the first scheduled transmission at least twice within the first roundtrip time (RTT) in a/the first HARQ process.

18. The method of claim 16, wherein the scheduling information indicates how many times the user equipment (UE) shall transmit the first message within the first roundtrip time (RTT) in the first HARQ process.

19. A transceiver node in a wireless communication network for data packet communication, comprising:
    a scheduler arranged to schedule resources in an the uplink for a user equipment (UE) to transmit a scheduled message, wherein the scheduler is arranged to schedule resources in the uplink in accordance with at least two alternative scheduling scenarios, a desired one of which is indicated by a preamble received from the UE in a random access procedure, and
    wherein the scheduler is further arranged to transmit a random access response to the UE before the first message is received;
    the random access response comprises scheduling information; and
    in at least one of the alternative scheduling scenarios, the scheduling information instructs the UE to transmit a message in a first subframe and to retransmit the message in a second subframe within a roundtrip time (RTT) in a hybrid automatic repeat request (HARQ) process triggered by transmission of the message in the first subframe.

20. The transceiver node of claim 19, wherein the scheduler, based on the preamble received, is arranged to transmit scheduling information for indicating how many times the UE is to transmit the message within the RTT in the HARQ process.

21. The transceiver node of claim 19, wherein the preamble is a member of one of at least one group, and according to the at least one group, the scheduler is arranged to schedule all transmissions of the message within the RTT.

22. The transceiver node of claim 19, wherein there is a set of preambles available for the random access procedure, and the set is divided into at least a first group and a second group, each group indicating a corresponding scheduling format.

23. A user equipment (UE) for a wireless communication network for packet data communication, the UE being arranged to access the wireless communication network by transmitting a preamble in a random access procedure before sending a message in a first scheduled transmission, wherein the preamble indicates one of at least two alternative scheduling scenarios; and the UE is arranged to transmit, in accordance with at least one of the alternative scheduling scenarios, the message in a first subframe and to retransmit the message in a second subframe within a roundtrip time in a hybrid automatic repeat request process triggered by transmission of the message in the first subframe.

* * * * *